United States Patent [19]

Abe et al.

[11] Patent Number: 5,654,963

[45] Date of Patent: Aug. 5, 1997

[54] SYSTEM AND METHOD FOR CONTROLLING ATM VIRTUAL CIRCUIT CONNECTION

[75] Inventors: Kohei Abe; Koichi Tanaka, both of Kanagawa-ken, Japan

[73] Assignee: Kabushiki Kaisha Toshiba, Kawasaki, Japan

[21] Appl. No.: 450,881

[22] Filed: May 26, 1995

[30] Foreign Application Priority Data

May 26, 1994 [JP] Japan ................................. 6-112953

[51] Int. Cl.$^6$ .............................................. H04L 12/56
[52] U.S. Cl. ........................... 370/234; 370/253; 370/360; 370/399
[58] Field of Search ................ 370/94.1, 94.2, 370/82, 84, 105.1, 60, 60.1, 13, 17, 58.1, 54, 58.2, 229, 230, 231, 232, 233, 234, 235, 236, 237, 238, 252, 253, 357, 360, 351, 352

[56] References Cited

U.S. PATENT DOCUMENTS

| | | | |
|---|---|---|---|
| 5,361,253 | 11/1994 | Feijen et al. | 370/17 |
| 5,400,336 | 3/1995 | Boyer et al. | 370/60.1 |
| 5,402,412 | 3/1995 | Duffie et al. | 370/17 |
| 5,455,917 | 10/1995 | Holeman et al. | 370/94.1 |

OTHER PUBLICATIONS

"Generic Cell Rate Algorithm (GCRA)", ATM User-Network Interface Specification Version 3.0, Sec. 3.6.2.4.1, The ATM Forum, Sep. 10, 1993, pp. 77-79.

Y. Unekawa et al., "155Mbps ATM/AAL3/4/5 Protocol Processing LSI", Technical Report of IEICE, Jun. 23, 1994, pp. 85-92.

Primary Examiner—Alpus H. Hsu
Assistant Examiner—Seema S. Rao
Attorney, Agent, or Firm—Foley & Lardner

[57] ABSTRACT

A communication control system for providing and registering a plurality of virtual circuits and sequentially transferring cells via the virtual circuits in response to request for transferring cells in an synchronous transfer mode is described. The communications control system comprises a device for determining whether or not it is permitted to transfer a cell via each virtual circuit having been registered in order to control the rate of transferring cells via the virtual circuit, and a device for erasing the registration of each virtual circuit if no cell is transferred via the virtual circuit for a predetermined time period after latest transmission on the basis of information for controlling the rate of transferring cells via the virtual circuit. In this configuration, erroneous operation is prevented which originates from overflow occurring in a counter for counting the present time.

10 Claims, 5 Drawing Sheets

SYSTEM AND METHOD FOR CONTROLLING ATM VIRTUAL CIRCUIT CONNECTION

BACKGROUND OF THE INVENTION

1. Field of the Invention

The present invention relates to a communication control system based on the Asynchronous Transfer Mode in the Broadband aspects of ISDN (called B-ISDN for short hereinbelow). In particular, it relates to an improvement of the performance of the asynchronous transfer by providing control means for controlling the asynchronous data transfer via each of a plurality of virtual circuits.

2. Description of the Prior Art

In the Asynchronous Transfer Mode, a frame prepared as a minimum data unit of information to be transferred is divided into a plurality of cells having a fixed bit length. The effective transfer rates via the respective virtual circuit can be adjusted by controlling the intervals between transfers of cells in accordance with the asynchronous transfer.

This control technique is called the average rate control. The average rate control is implemented by the leaky bucket algorithm. One example will be explained in the followings.

Figure 1:
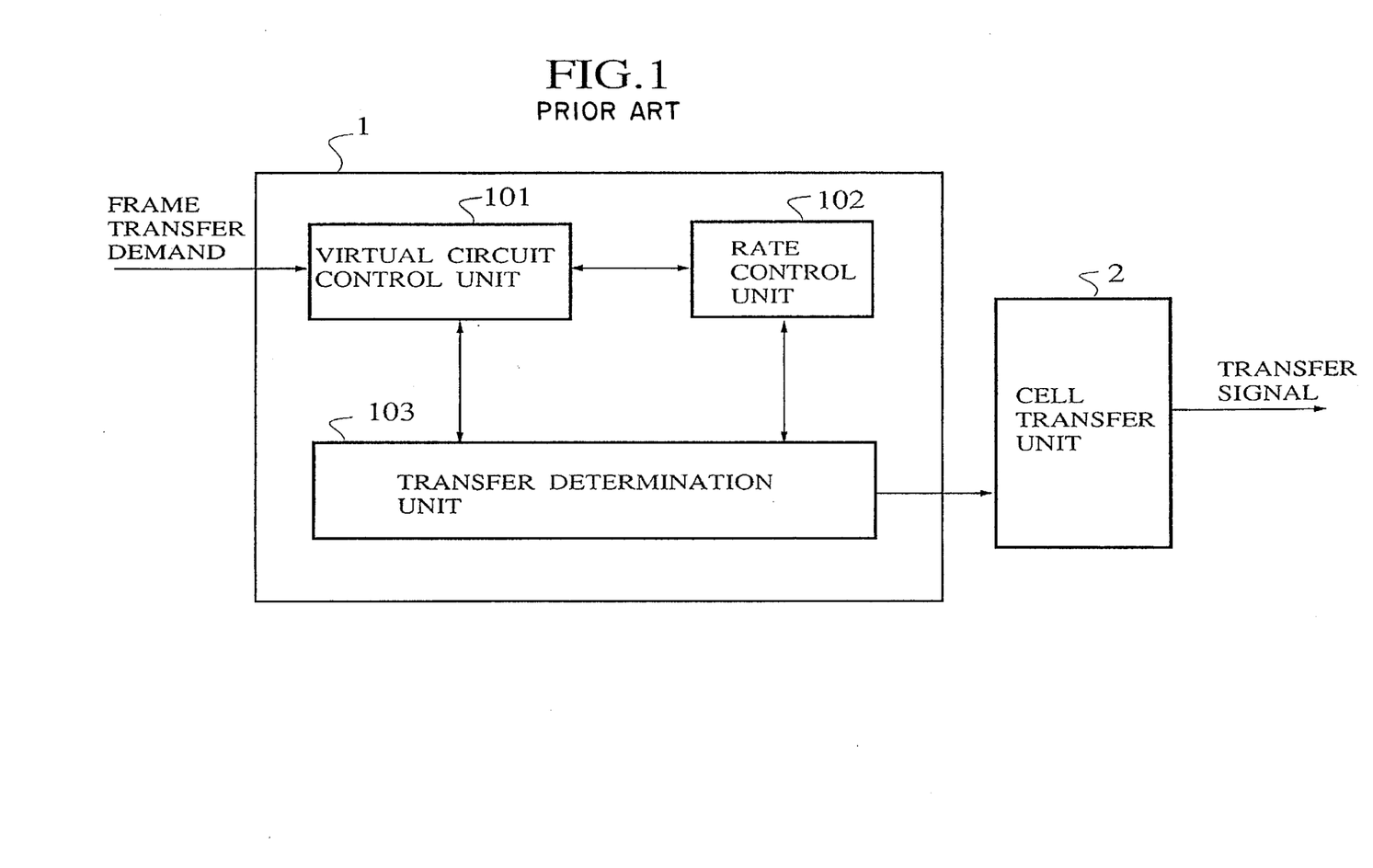
FIG. 1 is a schematic diagram showing an exemplary prior art communication control system.

An exemplary prior art communication control system comprises a cell transfer unit 2 and a controller 1 for controlling the transfer of cells on the basis of of the leaky bucket algorithm as illustrated in FIG. 1. The controller 1 includes the following three elements, i.e., a virtual circuit control unit 101, a rate control unit 102 and a transfer determination unit 103.

The virtual circuit control unit 101 is used to control virtual circuits through which cells are desired to be transferred. The rate control unit 102 is used to perform calculation on the basis of the leaky bucket algorithm as described herein and output the result thereof. The transfer determination unit 103 is used to determine which of the virtual circuits is next permitted to transfer a cell in accordance with the result of the calculation and to inform the cell transfer unit 2 of the virtual circuit thus determined.

Figure 2:
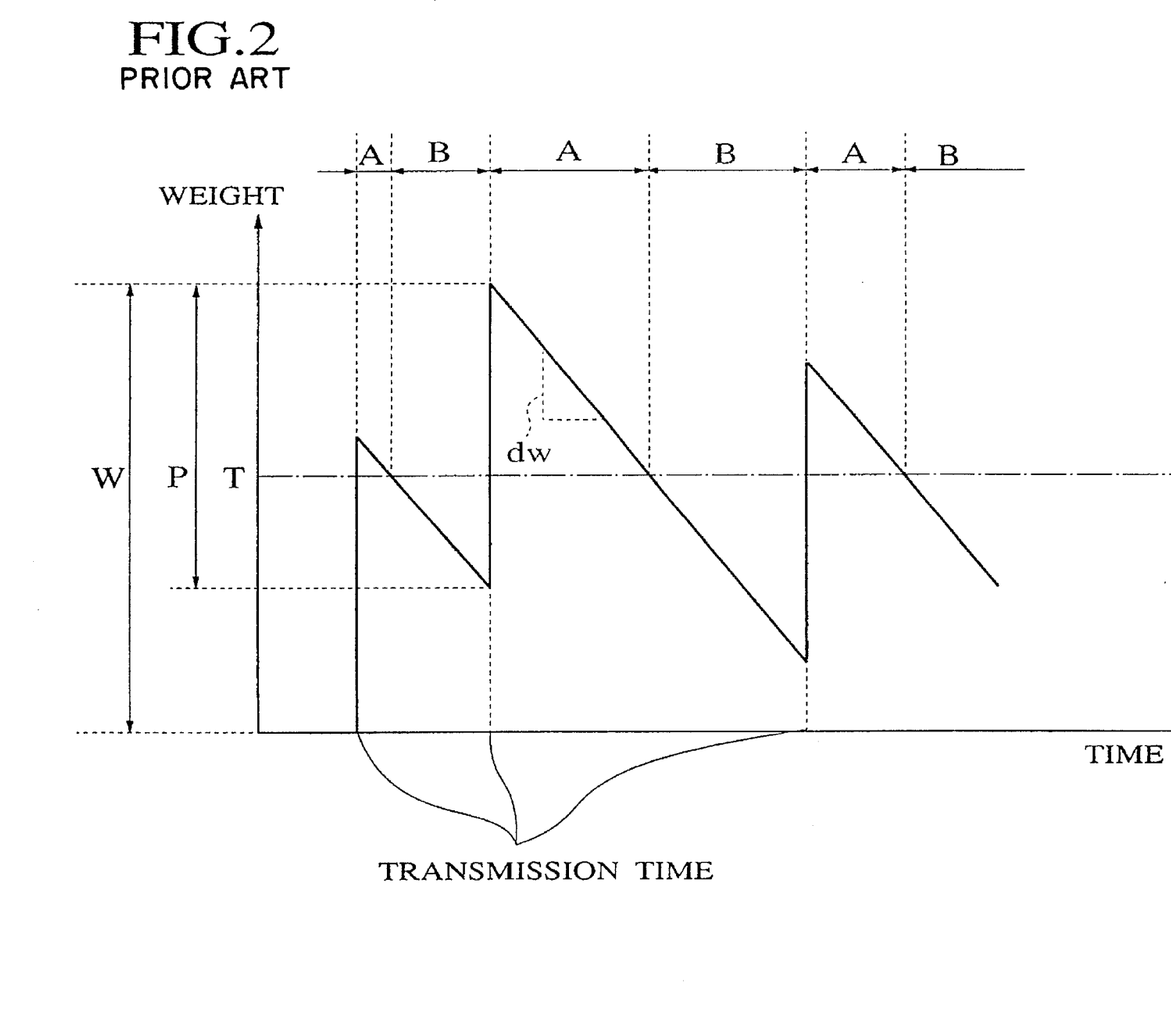
FIG. 2 is an exemplary diagram showing the basic mechanism of the leaky bucket algorithm.

The leaky bucket algorithm will be explained hereinbelow with reference to the diagram illustrating the variation of the credit which decreases with time after the transmission of a cell as illustrated in FIG. 2.

In accordance with the leaky bucket algorithm, a predetermined credit P is added to the current credit W at each transmission. The updated credit W is then decreased in proportion to the time passing thereafter by subtracting a predetermined credit dW per unit time. When the credit W is smaller than a certain threshold value T, the transmission of a cell is permitted.

In the case as illustrated in FIG. 2, the transmission of a cell is not permitted in the time periods A but permitted in the time periods B.

Two methods have been employed in the prior art techniques. The two methods will be explained hereinbelow also with reference to FIG. 3.

Figure 3:
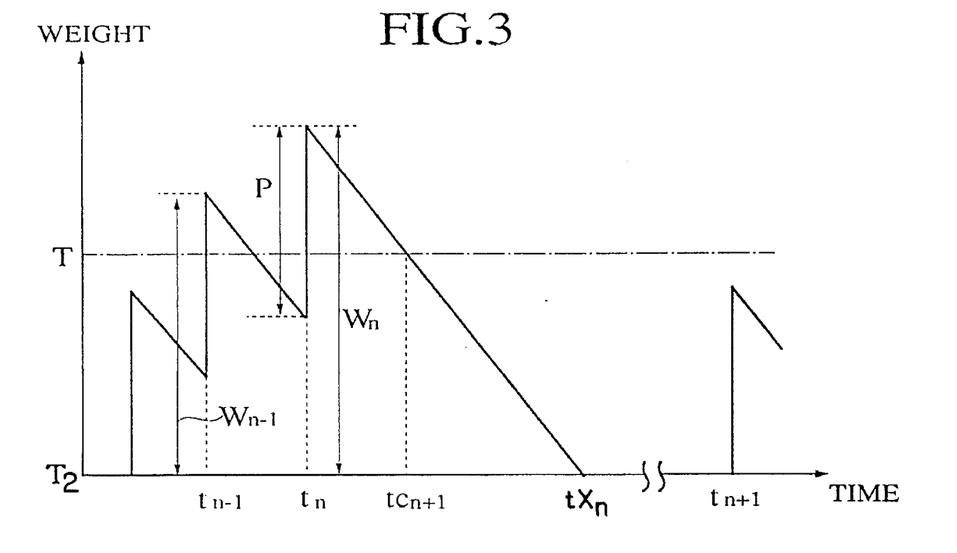
FIG. 3 is an exemplary diagram showing the process of handling the credit in accordance with the leaky bucket algorithm.

In accordance with one method, the credits W corresponding to the respective virtual circuits are decreased as the time passes. Each credit W is compared with the threshold value T at each time point in order to determine whether or not it is permitted to transfer a cell through each corresponding virtual circuit.

In accordance with the other method, the following equation is calculated at the time point tn in order to obtain the time point tCn+1 at which the subsequent cell can be transferred. The next cell to be transferred is determined by comparing the time point tCn+1 of each virtual circuit to the present time.

$$Wn = P + Wn-1 - (tn-tn-1) \times dW$$

$$tCn+1 = tn + (Wn-T)/dW (Wn>T)$$

$$tCn+1 = tn + 1 (Wn \leq T) \quad (1)$$

where tn is the time point at which the n-th cell is transferred through the virtual circuit in question; Wn is the credit which is increased by a certain value P when the n-th cell is transferred; and dW is a decrement per unit time. If a minimum interval C between adjacent transmissions is introduced, the following equation is employed instead of the above equation (1).

$$tCn+1 = tn + C (dTn \leq C)$$

$$tCn+1 = tn + dTn \ (dTn > C) \quad (2)$$

where $$dTn = (Wn-T)/dw (Wn>T)$$

$$dTn = 0 ((Wn \leq T) \quad (3)$$

Since the unit time dW is usually 1, the above equations (1) and (2) are rearranged as follows and implemented by 0 judgement means and addition/subtraction means.

$$Wn = P + Wn-1 - (tn-tn-1)$$

$$tCn+1 = tn + @(@(Wn-T)-C)+C \quad (4)$$

where $$@(x)=0 \ (x \leq 0)$$

$$@(x)=x \ (x>0)$$

Namely, in accordance with the second method, the time point tCn+1 at which the subsequent cell can be transferred is calculated at the transmission time of the preceding cell by means of the virtual circuit control unit 101 and thereafter compared with the present time by means of the transfer determination unit 103 in order to determine the next cell to be transferred. The result of determination is given to the cell transfer unit 2.

As described above, there are several shortcomings as follows in the case of the first method and the second method of the conventional communication control systems.

The virtual circuit control unit 101 shown in FIG. 1 is usually provided with means for storing the results of calculation for rate control by the rate control unit 102 as credits indicative of the rate control information. The rate control information corresponding to one virtual circuit is read from the virtual circuit control unit 101 by the rate control unit 102.and subjected to arithmetic logical operation with the time information stored in the rate control unit 102, followed by writing the result of the arithmetic logical operation back to the storing means in the virtual circuit control unit 101.

In the case that each line of k virtual circuits is given a private credit W(m) (m=1,2,3, ... k) respectively in accordance with the first method, k credits must be stored in the storing means in the virtual circuit control unit 101, read out to subtract the unit time dW therefrom and written back to the storing means in the virtual circuit control unit 101.

Because of this, when the number k of virtual circuits is increased, it becomes difficult to perform the reading, the subtraction and the writing back of the respective credits within an predetermined available time.

In accordance with the second method, since the reading operation, the calculation and the writing back of the credit W is carried out only with respect to the virtual circuit via which transmission of a cell is instantly determined by the transfer determination unit 103, the task of the rate control unit 102 is not increased in proportion to the number k of virtual circuits so that the above described problem no longer arises.

However, in the case that there is a request for transferring a cell at the time point tn+1 when substantial time passes after the time point tCn+1 at which the transmission of a cell becomes possible as illustrated in FIG. 3, i.e., in the case that there is no cell to be transferred for a relatively long time after transmission of a preceding cell, the following problem arises.

The logical operation necessary for determining the respective time point and the judgement of the transmission of a cell are implemented by carrying out logical operation and the comparison between the counted number in a present time counter indicative of the present time and the respective number corresponding to the time point necessary is for controlling the transmission rate stored in the virtual circuit control unit 101. The present time counter is commonly utilized for all the virtual circuits since it is difficult to provide a respective private counter for each virtual circuit when the number of virtual circuits is large.

In the case of the second method, the transfer determination unit 103 makes determination of whether or not a cell can be transferred with respect to the registered virtual circuits in turn. Namely, the determination is made by comparing the present time tn+1 counted in the present time counter to the transfer enabling time tCn+1 stored in memory means of the virtual circuit control unit 101 and indicative of the time point at which transmission of a next cell becomes possible. However, since the present time counter has a finite number of available bits and always carries out counting up, the present time counter possibly overflows, resulting in the negative difference in the counted number between the transfer enabling time tCn+1 and the present time tn+1. The transfer determination unit 103 therefore erroneously judges that it is not yet permitted to transfer a cell because of the negative difference.

This problem will be explained in details in the case that the judgement is made based upon the most significant bit of the sum of the number A counted by a 18 bit present time counter indicative of the present time and the complement B' of the number B indicative of the transfer enabling time. In this case, if the most significant bit of the sum is 0 the difference A–B is positive while if the most significant bit of the sum is 1 the difference A–B is negative.

There arise in this case a problem, for example, when a cell is transferred at time FF00H (the last H is simply indicative of the hexadecimal number) followed by storing the next transfer enabling time 0100H (after the overflow across FFFFH and 0000H). Namely, the judgement in the transfer determination unit 108 is made on the basis of the difference calculated by subtracting the transfer enabling time from the present time. When the present time lies between FF01H and 00FFH, it is correctly judged that the transmission is permitted because the difference is negative. However, when the present time lies between 8100H and 0100H, it is erroneously Judged that the transmission is not permitted because the difference is positive.

Figure 4:
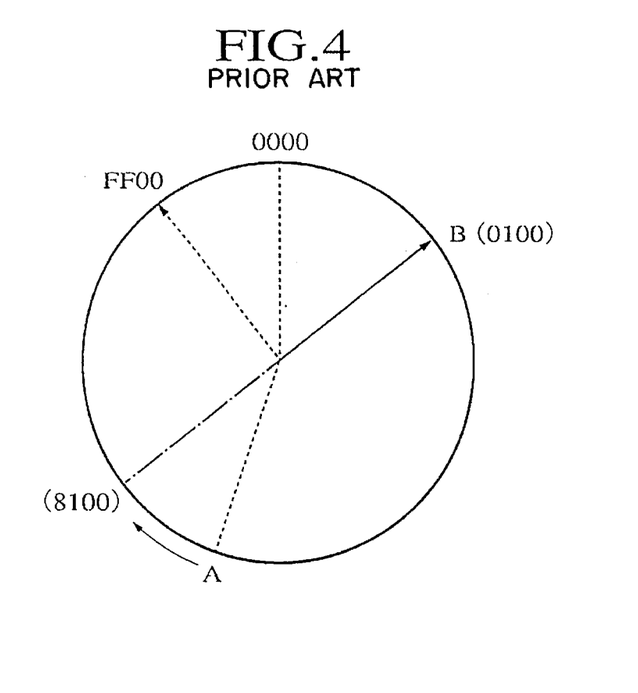
FIG. 4 is an exemplary diagram showing the process of controlling the transmission of cells in accordance with the present invention.

This will be easily understood from FIG. 4 showing a clock-like diagram. Namely, the difference A–B indicates the transfer enabling time B as the future or the past, irrespective of the actual time passing, in accordance with in which side the transfer enabling time B is located as seen from the midpoint (8100) corresponding to 180 degrees with the entire span being 380 degrees. When the present time passes the midpoint (8100), the transfer enabling time B is recognized not to be reached.

Furthermore, it is also the case that the difference between the preceding transmission time tn and the subsequent transmission time tn+1 can not correctly be calculated in the same manner as the difference A–B in the following equation for calculating the credit.

$$Wn+1=P+Wn-(tn+1-tn)$$

SUMMARY OF THE INVENTION

The present invention has been made in order to solve the shortcomings as described above. It is an object of the present invention to provide a communication control system capable of accurately controlling the average rates of transferring cells via the respective virtual circuits.

It is another object of the present invention to provide a communication control system having improved transferring performance.

It is a further object of the present invention to provide a communication control system implemented with a counter having a limited number of available bits for counting the present time.

To achieve the foregoing and other objects and in accordance with the present invention, as embodied and broadly described herein, a communication control system for providing and registering a plurality of virtual circuits and sequentially transferring cells via the virtual circuits in response to requests for transferring cells in an asynchronous transfer mode comprises means for determining whether or not it is permitted to transfer a cell via each virtual circuit having been registered in order to control the rate of transferring cells via the virtual circuit and means for erasing the registration of each virtual circuit if no cell is transferred via the virtual circuit for a predetermined time period after latest transmission.

The determining means preferably determines by the average rate control whether or not it is permitted to transfer a cell via each virtual circuit having been registered.

Furthermore, the determining means preferably determines by the leaky bucket algorithm whether or not it is permitted to transfer a cell via each virtual circuit having been registered.

The communication control system in accordance with a preferred embodiment further comprises means for counting a present time, means for updating a credit for each virtual circuit by decreasing the credit by a time-proportional decrement proportional to a differential time between the present time and a previous transfer time at which a previous cell is transferred via the virtual circuit and adding a predetermined increment to the credit when a cell is transferred, and means for calculating a transfer enabling time for each virtual circuit, when a preceding cell is transferred via the virtual circuit, at which transfer enabling time it is permitted to transfer a next cell via the virtual circuit. The transfer enabling time is calculated as a time at which the credit updated at the transmission of the preceding cell minus the time-proportional decrement reaches to a first threshold credit. The determining means determines whether or not it is permitted to transfer a cell via each virtual circuit by comparing the transfer enabling time to the present time.

Furthermore, the communication control system in accordance with a preferred embodiment comprises means for calculating a registration erasing time for each virtual circuit, when a cell is transferred via the virtual circuit, at which registration erasing time the registration of the virtual circuit is to be erased. The registration erasing time is calculated as a time at which the credit updated at the transmission of the preceding cell minus the time-proportional decrement reaches to a second threshold credit. The erasing means determines erasure of the registration of the virtual circuit if no cell is transferred via the virtual circuit after transmission of the preceding cell until the registration erasing time.

Still further, the communication control system in accordance with a preferred embodiment comprises means for detecting a last one of a plurality of cells constituting a unit of frame to be transferred. The erasing means makes the determination of erasure only after the detecting means detect the last cell for each virtual circuit.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF EMBODIMENTS

Referring now to the accompanying drawings, exemplary communication control systems in accordance with the embodiments of the present invention will be described.

First, the basic mechanism of the present invention will be briefly explained.

The control procedure as explained in conjunction with FIG. 3 is taken also in this case as long as cells are continuously transferred.

Namely, the n-th credit Wn is calculated by subtracting a decrement (tn−tn−1) from the (n−1)-th credit Wn−1 at the transmission of the preceding cell and adding thereof a constant credit P which is predetermined corresponding to each virtual circuit. The decrement (tn−tn−1) is proportional to the time passing from the transmission of the preceding cell.

Furthermore, the transfer enabling time tCn+1 is obtained as a time at which the credit Wn is decreased to the threshold value T.

The transfer enabling time tCn+1 is readily compared to the present time and, when it reaches to the transfer enabling time tCn+1, the communication control system transfers a cell to be transferred, if any, through the corresponding virtual circuit. The basic equations are shown again in below.

$$Wn = P + Wn-1 - (tn-tn-1)$$

$$tCn+1 = tn + @(@(Wn-T)-C)+C \quad (5)$$

where $$@(x) = 0 \quad (x \leq 0)$$

$$@(x) = x \quad (x > 0)$$

The gist of the present invention lies in the erasure of the registration of the virtual circuit via which no cell is transferred a predetermined period after the transfer enabling time tCn+1. Of course, if there arises a new request of transferring cells, the virtual circuit is registered again. Concerning the virtual circuit registered anew, transmission of cells are immediately initiated without comparison between the transfer enabling time and the present time so that the overflow of a counter is no longer problematic.

Figure 5:
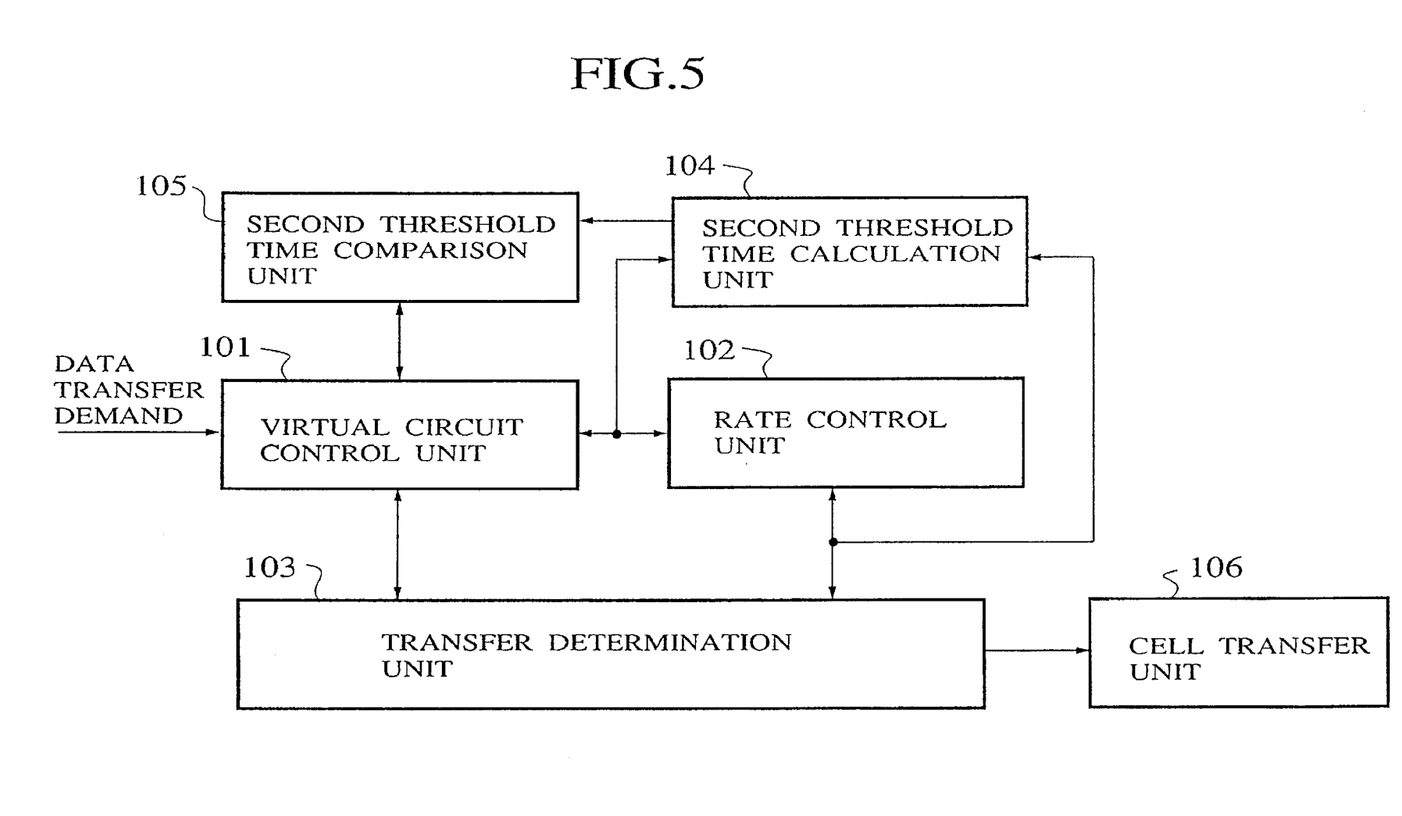
FIG. 5 is a schematic diagram showing a communication control system in accordance with a first embodiment of the present invention.

Next, referring to a block diagram shown in FIG. 5, a communication control system in accordance with a first embodiment of the present invention will be described. The communication control system as illustrated in FIG. 5 comprises a virtual circuit control unit 101, a rate control unit 102, a transfer determination unit 103, a second threshold time calculation unit 104, a second threshold time comparison unit 105 and a cell transfer unit 106.

When there arises a request of transferring cells through a new virtual circuit, the virtual circuit control unit 101 registers the new virtual circuit within the control unit as a new entry through which cells can be transferred. The respective times and the credits for adjusting the average rates of the respective virtual circuits are controlled by the virtual circuit control unit 101. When there arises a request from the second threshold time comparison unit 105 for erasing the registration of a virtual circuit under control, the information for controlling the virtual circuit is initialized to erase the registration as explained below.

The rate control unit 102 reads from the virtual circuit control unit 101 the rate control information of the virtual circuit via, i.e., the time information tn−1 at which the latest cell is transferred and the counted number (credit) Wn−1 indicative of that transfer time. The rate control information Wn−1 and tn−1 is updated in accordance with the equation (5). The updated next rate control information Wn and tn is stored in the virtual circuit control unit 101 for controlling the transmission of the subsequent cell.

The transfer determination unit 103 includes a counter for counting the present time and means for performing logic operations in order to determine the virtual circuit via which a cell can be transferred by comparing the present time to the transfer enabling times of the respective virtual circuits in turn. However, if there is a virtual circuit registered anew, transmission of a cell is immediately allowed without comparison between the transfer enabling time and the present time.

The second threshold time calculation unit 104 reads from the virtual circuit control unit 101 the rate control information of the virtual circuit via which a cell is instantly determined by the transfer determination unit 103 to be transmitted, i.e., the counted number (credit) corresponding to the present time. The rate control information is updated and stored in the virtual circuit control unit 101 for controlling the timing of transferring the subsequent cell.

The second threshold time comparison unit 105 compares the second threshold times of the respective virtual circuits calculated by the second threshold time calculation unit 104 with the present time and output a request for erasing the registration of a virtual circuit of which the second threshold time passes.

Meanwhile, the above described constituent units are preferably formed within a single semiconductor substrate as an integrated circuit.

In the procedure described above, time, tXn, at which the second threshold is reached after the transmission time tn illustrated in FIG. 3 is calculated by means of the second threshold time calculation unit 104 in accordance with the following equation.

$$tXn = tn + Wn - T2 \quad (6)$$

where T2 is a second threshold.

If the initial value of Wn is 0, the calculation is carried out always with Wn=0 after the second threshold time tXn. It is therefore natural to determine T2=0. The following description is made in this case.

When a cell is transferred via a virtual circuit having already registered in the virtual circuit control unit 101, the first threshold time tCn+1 and the second threshold time tXn are calculated by means of the rate control unit 102 and the second threshold time calculation unit 104 respectively and stored in the virtual circuit control unit 101. Note that the next cell transfer enabling time is calculated as the time at which the credit updated at the transmission of the preceding cell minus the time-proportional decrement reaches to the first threshold credit.

It is judged in the transfer determination unit 103 whether or not the transmission of a cell via a respective virtual circuit is permitted, by comparing the first threshold time tCn+1 to the present time, between the transmission time tn and the second threshold time tXn.

When the present time reaches to the second threshold time tXn, the rate control information is initialized with Wn=0 in the virtual circuit control unit 101 and the registration of the virtual circuit is erased so that the judgement of transmission is no longer carried out in the transfer determination unit 103 with respect to the erased virtual circuits.

Note that the registration erasing time is calculated as the time when the credit updated at the transmission of the preceding cell minus the time-proportional decrement reaches the second threshold credit.

The judgement of transmission in the transfer determination unit 103 is therefore carried out only between the present time tn and the second threshold time tXn so that it is possible to count the time passing only by means of a counter capable of handling a finite number of bits.

However, needless to say, the maximum counted number for counting the present time must be no smaller than twice the sum of the addition credit P and the threshold value T.

Also, it is possible to carry out calculation in the rate control unit 102 within a finite number of bits since time information in the virtual circuit control unit 101 necessary for controlling the transmission rate is always between the transmission time tn and the second threshold time tXn between which the possibility of transferring a next cell has to be judged.

Furthermore, after the second threshold time tXn, the virtual circuit has no longer registered in the virtual circuit control unit 101 and therefore the total performance of the communication control system is improved while the procedure of determining which virtual circuit is used for next transmission of a cell is carried out only for a limited number of virtual circuits except the virtual circuits having been erased.

The updating the credit W and the calculation of the first threshold time and the second threshold time are performed immediately after the decision of transferring a cell and sometimes are performed partially in parallel with transmission of a cell.

Figure 6:
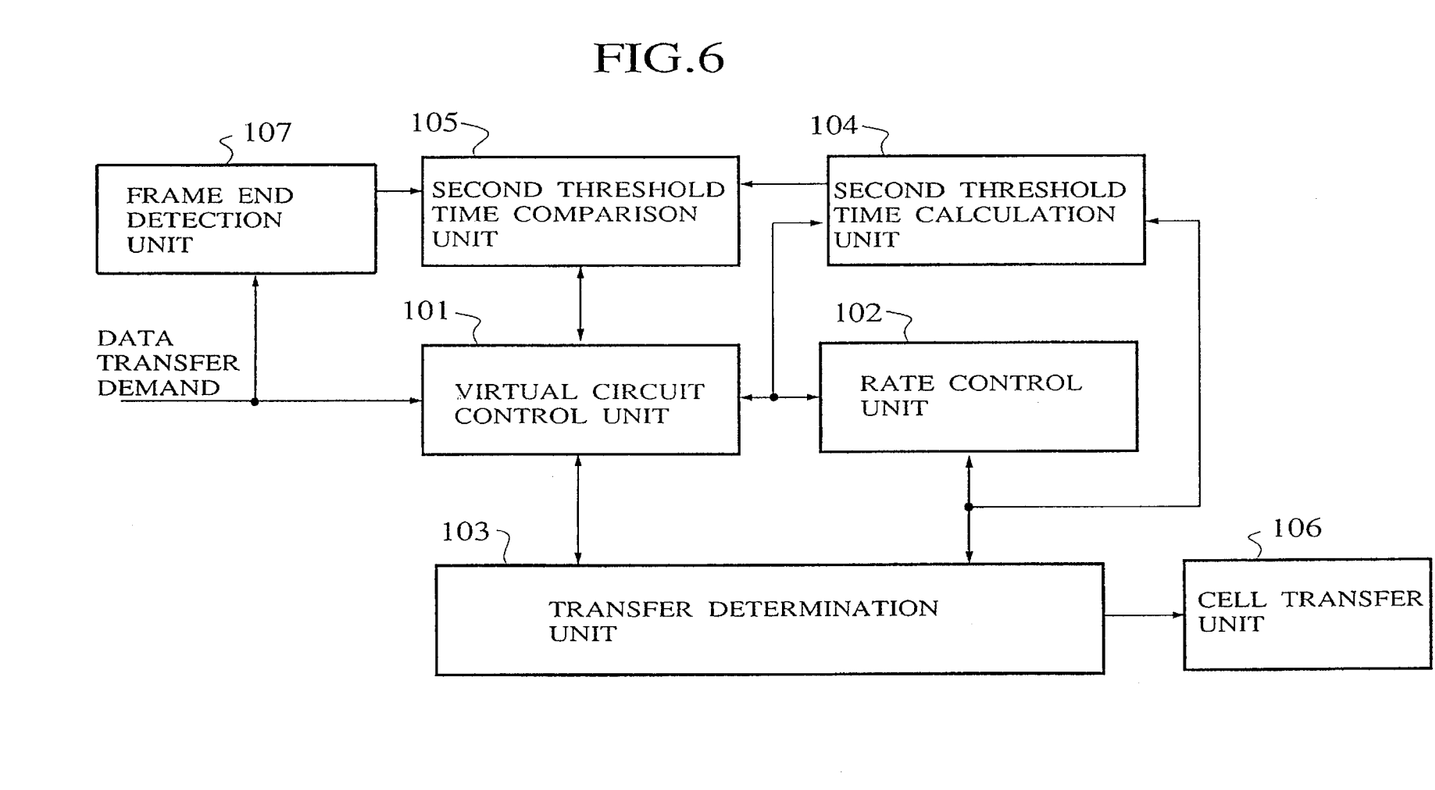
FIG. 6 is a schematic diagram showing a communication control system in accordance with a second embodiment of the present invention.

Next, referring to a block diagram shown in FIG. 6, a communication control system in accordance with a second embodiment of the present invention will be described. The communication control system as illustrated in FIG. 6 comprises a virtual circuit control unit 101, a rate control unit 102, a transfer determination unit 103, a second threshold time calculation unit 104, a second threshold time comparison unit 105a, a cell transfer unit 106 and an frame end detection unit 107. Redundant description is dispensed with while similar reference numbers are given to similar elements as in FIG. 5 illustrating the first embodiment.

In this embodiment, there is provided the frame end detection unit 107 which outputs a signals indicative of the end of a frame to be transferred. The second threshold time comparison unit 105a receives the signal from the frame end detection unit 107 and judges whether or not the registration of a virtual circuit should be erased on the basis of the frame end information only with respect to the virtual circuit via which a frame have been completely transferred.

A frame consists usually of a plurality of cells, which are transferred while the credit is between 0 and its maximum value corresponding to the sum of the addition credit P and the threshold value T during transmission. The second threshold time calculation unit 104 is therefore not necessary during the transmission of a frame.

Because of this, the second threshold time comparison unit 105a judges whether or not the registration of a virtual circuit should be erased only with respect to a virtual circuit via which the last cell of a frame has been transferred. The total performance of the communication control system is therefore improved while the unnecessary procedure of erasing and registering a virtual circuit which is transferring cells of a frame.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A communication control system for providing and registering a plurality of virtual circuits and sequentially transferring cells via said virtual circuits in response to requests for transferring cells in an asynchronous transfer mode, with credits being assigned respectively to said virtual circuits and decreasing with time, comprising:

means for registering virtual circuits as ready for transmission of cells;

means for initiating the transmission of a cell via one of said registered virtual circuits on the basis of evaluation of a credit assigned to said one of said virtual circuits, which credit is updated when a previous cell is transmitted via said one of said virtual circuits;

wherein the credit is evaluated with reference to a counter for measuring intervals of time;

wherein when there is a cell to be transferred via said one of said virtual circuits, transmission of a cell is initiated on the condition that the credit assigned to said one of said virtual circuits is no higher than a first threshold value; and means for erasing the registration of said one of said virtual circuits when there is no cell to be transferred via said one of said virtual circuits and the credit assigned to said one of said virtual circuits is decreased to no higher than a second threshold value.

2. The communication control system as claimed in claim 1 wherein said means for initiating the transmission determines, by an average rate control, whether or not it is permitted to transfer a cell via said one of said virtual circuits having been registered.

3. The communication control system as claimed in claim 1 wherein said means for initiating the transmission determines by a leaky bucket algorithm, whether or not it is permitted to transfer a cell via said one of said virtual circuits having been registered.

4. The communication control system as claimed in claim 1 further comprising:

means for updating a credit for said virtual circuit by decreasing the credit by a time-proportional decrement proportional to a differential time between the present time and a previous transfer time at which a previous cell is transferred via said virtual circuit and adding a predetermined increment to the credit when a cell is transferred; and means for calculating a transfer enabling time for said each of said virtual circuits, when a preceding cell is transferred via said virtual circuit, at which calculated transfer enabling time, it is permitted to transfer a next cell via said each of said virtual circuits, said transfer enabling time being calculated as a time at which the credit updated at the transmission of said preceding cell minus the time-proportional decrement reaches to a first threshold credit, wherein said means for initiating transmission determines whether or not it is permitted to transfer a cell via said virtual circuit by comparing the transfer enabling time to the present time.

5. The communication control system as claimed in claim 4 wherein said means for erasing further comprises means for calculating a registration erasing time for said each of said virtual circuits, when a cell is transferred via said each of said virtual circuits, at which registration erasing time the registration of the virtual circuit is to be erased, said registration erasing time being calculated as a time at which the credit updated at the transmission of said preceding cell minus the time-proportional decrement reaches to a second threshold credit, wherein said erasing means determines erasure of the registration of said each of said virtual circuits if no cell is transferred via said each of said virtual circuits after transmission of the preceding cell until said registration erasing time.

6. The communication control system as claimed in claim 5 further comprising means for detecting a last one of a plurality of cells constituting a unit of a frame to be transferred wherein said erasing means makes the determination of erasure only after said detecting means detects the last cell for said each of said virtual circuits.

7. A communication control system for providing and registering a plurality of virtual circuits and sequentially transferring cells via said virtual circuits in response to requests for transferring cells in an asynchronous transfer mode, said communication control system comprising:

means for registering virtual circuits as ready for transmission of cells;

means for counting a present time;

means for updating a credit for each of said virtual circuits by decreasing the credit by a time-proportional decrement proportional to a differential time between the present time and a previous transfer time at which a cell is transferred via one of said virtual circuits and adding a predetermined increment to the credit when a cell is transferred;

means for calculating a transfer enabling time for each of said virtual circuits, when a preceding cell is transferred via said one of said virtual circuits, at which calculated transfer enabling time for a particular said virtual circuit it is permitted to transfer a next cell via said particular virtual circuit, said transfer enabling time being calculated as a time at which the credit updating at the transmission of said preceding cell minus the time-proportional decrement reaches to a first threshold credit, means for determining whether or not it is permitted to transfer a cell via each of said virtual circuits having been registered by comparing the transfer enabling time to the present time;

means for calculating a registration erasing time for said each of said virtual circuits when the preceding cell is transferred via said one of said virtual circuits, at which registration erasing time the registration of said each of said virtual circuits is to be erased, said registration erasing time being calculated as a time at which the credit updating at the transmission of said preceding cell minus the time-proportional decrement reaches to a second threshold credit; and means for erasing the registration of any of said each virtual circuits if no cell is transferred via that virtual circuit during the time period beginning after transmission of the preceding cell until said registration erasing time.

8. The communication control system as claimed in claim 7 wherein said determining means determines by an average rate control whether or not it is permitted to transfer a cell via said each of said virtual circuits having been registered.

9. The communication control system as claimed in claim 7 wherein said determining means determines by a leaky bucket algorithm whether or not it is permitted to transfer a cell via said each of said virtual circuits having been registered.

10. The communication control system as claimed in claim 7 further comprising means for detecting a last one of a plurality of cells constituting a unit of a frame to be transferred wherein said erasing means makes the determination of erasure only after said detecting means detects the last cell for each virtual circuits.

* * * * *